(12) United States Patent
Manda

(10) Patent No.: US 9,635,217 B2
(45) Date of Patent: Apr. 25, 2017

(54) IMAGE FORMING APPARATUS THAT CONVERTS INPUT COLOR VALUE TO REPRESENTATIVE COLOR VALUE WITHIN CONSTANT HUE PLANE AND USES CONVERTED COLOR VALUE AS PRINTING COLOR VALUE, AND IMAGE FORMING METHOD

(71) Applicant: KYOCERA Document Solutions Inc., Osaka-shi, Osaka (JP)

(72) Inventor: Etsuko Manda, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/886,117

(22) Filed: Oct. 19, 2015

(65) Prior Publication Data

US 2016/0112605 A1    Apr. 21, 2016

(30) Foreign Application Priority Data

Oct. 21, 2014 (JP) ................................ 2014-214889

(51) Int. Cl.
  *G03F 3/08*  (2006.01)
  *H04N 1/60* (2006.01)
  *H04N 1/62* (2006.01)
  *H04N 1/46* (2006.01)

(52) U.S. Cl.
  CPC ......... *H04N 1/6016* (2013.01); *H04N 1/6038* (2013.01); *H04N 1/62* (2013.01)

(58) Field of Classification Search
  None
  See application file for complete search history.

(56) References Cited

U.S. PATENT DOCUMENTS

2015/0116780 A1\* 4/2015 Manda .................. H04N 1/405
                                                  358/3.06

FOREIGN PATENT DOCUMENTS

| JP | 4083311 B2 | | 4/2008 |
|---|---|---|---|
| JP | 2011146940 A | \* | 7/2011 |
| JP | 5135362 B2 | | 2/2013 |

\* cited by examiner

*Primary Examiner* — Dov Popovici

(57) ABSTRACT

A color converter includes a printing color value determining unit and a determination color value calculating unit. The determination color value calculating unit calculates a determination color value in such a way that a positional relationship of a input color value relative to a input peak value, a white color value showing a color value of white, and a black color value showing a color value of black is equal to a positional relationship of the determination color value relative to the determination peak value, the white color value, and the black color value. The printing color value determining unit determines, as a printing color value, the representative color value closest to the determination color value calculated by the determination color value calculating unit in the Voronoi diagram.

3 Claims, 16 Drawing Sheets

IMAGE FORMING APPARATUS THAT CONVERTS INPUT COLOR VALUE TO REPRESENTATIVE COLOR VALUE WITHIN CONSTANT HUE PLANE AND USES CONVERTED COLOR VALUE AS PRINTING COLOR VALUE, AND IMAGE FORMING METHOD

INCORPORATION BY REFERENCE

The disclosures of Japanese Patent Application No. 2014-214889 filed on Oct. 21, 2014 including the specifications, drawings, and abstracts are incorporated herein by reference in their entireties.

BACKGROUND

The present disclosure relates to a color converter, a color conversion method, and a non-transitory computer-readable recording medium capable of storing a color conversion program, for converting an input color value to one of a plurality of representative color values and using the converted color value as a printing color value for a printing device.

In recent years, energy conservation has been considered important for ecology and cost reduction. To achieve energy conservation, image forming apparatuses, such as copiers and printers, convert input images to images composed only of representative color values for printing such as single-colored printing and two-color printing.

In the case of converting an input image to an image composed only of representative color values and outputting the resulting image, a known technique is that color values of pixels of the input image are converted to representative color values closest to color values in an RGB color space or a CMYK color space. In this technique, however, the RGB color space and the CMYK color space depend on an output device of an image, and thus, an actually output image varies among output devices, disadvantageously.

In a known technique for solving this problem, color values of pixels of an input image are converted from color values on an RGB color space or a CMYK color space to color values on a device-independent Lab color space expressed by human sense, and then, the resulting color values are converted to closest representative color values on the Lab color space. In this technique, however, in conversion of color values of pixels to closest representative color values, the distance to all the representative color values are obtained for color values of pixels of an input value and the representative color values at the closest distance are used as color values of the pixels after the conversion, and thus, there arises a problem that a large processing amount and a long processing time are necessary for conversion.

In a known technique for solving the problem, color values of pixels, i.e., representative color values that are closest to input color values in a Voronoi diagram are determined as printing color values for a printing device.

SUMMARY

In an aspect of the present disclosure, a color converter is a color converter for converting an input color value to one of a plurality of representative color values within a constant hue plane and using the converted color value as a printing color value for a printing device. The color converter includes a printing color value determining unit and a determination color value calculating unit. The printing color value determining unit determines the printing color value in a Voronoi diagram whose generatrixes are the representative color values in a device-independent color space. The determination color value calculating unit calculates a determination color value showing a color value for determining the printing color value. The determination color value calculating unit determines, as a determination peak value, a color value having a lightness equal to that of an input peak value showing a maximum color value of saturation in a constant hue plane of the input color value and also having a hue and a saturation equal to those of a representative peak value showing a maximum color value of saturation in a constant hue plane of the representative color values. The determination color value calculating unit calculates the determination color value in such a way that a positional relationship of the input color value relative to the input peak value, a white color value showing a color value of white, and a black color value showing a color value of black is equal to a positional relationship of the determination color value relative to the determination peak value, the white color value, and the black color value. The printing color value determining unit determines, as the printing color value, the representative color value closest to the determination color value calculated by the determination color value calculating unit in the Voronoi diagram.

In another aspect of the present disclosure, a color conversion method is a color conversion method for converting an input color value to one of a plurality of representative color values within a constant hue plane and using the converted color value as a printing color value for a printing device. The color conversion method includes: a printing color value determining step of determining the printing color value in a Voronoi diagram whose generatrixes are the representative color values in a device-independent color space; and a determination color value calculating step of calculating a determination color value showing a color value for determining the printing color value. The determination color value calculating step is a step of determining, as a determination peak value, a color value having a lightness equal to that of an input peak value showing a maximum color value of saturation in a constant hue plane of the input color value and also having a hue and a saturation equal to those of a representative peak value showing a maximum color value of saturation in a constant hue plane of the representative color values. The determination color value calculating step is a step of calculating the determination color value in such a way that a positional relationship of the input color value relative to the input peak value, a white color value showing a color value of white, and a black color value showing a color value of black is equal to a positional relationship of the determination color value relative to the determination peak value, the white color value, and the black color value. The printing color value determining step is a step of determining, as the printing color value, the representative color value closest to the determination color value calculated in the determination color value calculating step in the Voronoi diagram.

In yet another aspect of the present disclosure, a recording medium is a non-transitory computer-readable recording medium capable of storing a color conversion program executable by a computer. The color conversion program is a color conversion program for converting an input color value to one of a plurality of representative color values within a constant hue plane and using the converted color value as a printing color value for a printing device. The color conversion program causes the computer to function as a printing color value determining unit that determines the printing color value in a Voronoi diagram whose generatrixes are the representative color values in a device-independent color space, and as a determination color value calculating unit that calculates a determination color value showing a color value for determining the printing color value. The determination color value calculating unit determines, as a determination peak value, a color value having a lightness equal to that of an input peak value showing a maximum color value of saturation in a constant hue plane of the input color value and also having a hue and a saturation equal to those of a representative peak value showing a maximum color value of saturation in a constant hue plane of the representative color values. The determination color value calculating unit calculates the determination color value in such a way that a positional relationship of the input color value relative to the input peak value, a white color value showing a color value of white, and a black color value showing a color value of black is equal to a positional relationship of the determination color value relative to the determination peak value, the white color value, and the black color value. The printing color value determining unit determines, as the printing color value, the representative color value closest to the determination color value calculated by the determination color value calculating unit in the Voronoi diagram.

DETAILED DESCRIPTION

An embodiment of the present disclosure will be described with reference to the drawings.

First, a configuration of a multifunction peripheral (MFP) as a color converter according to this embodiment will be described.

Figure 1:
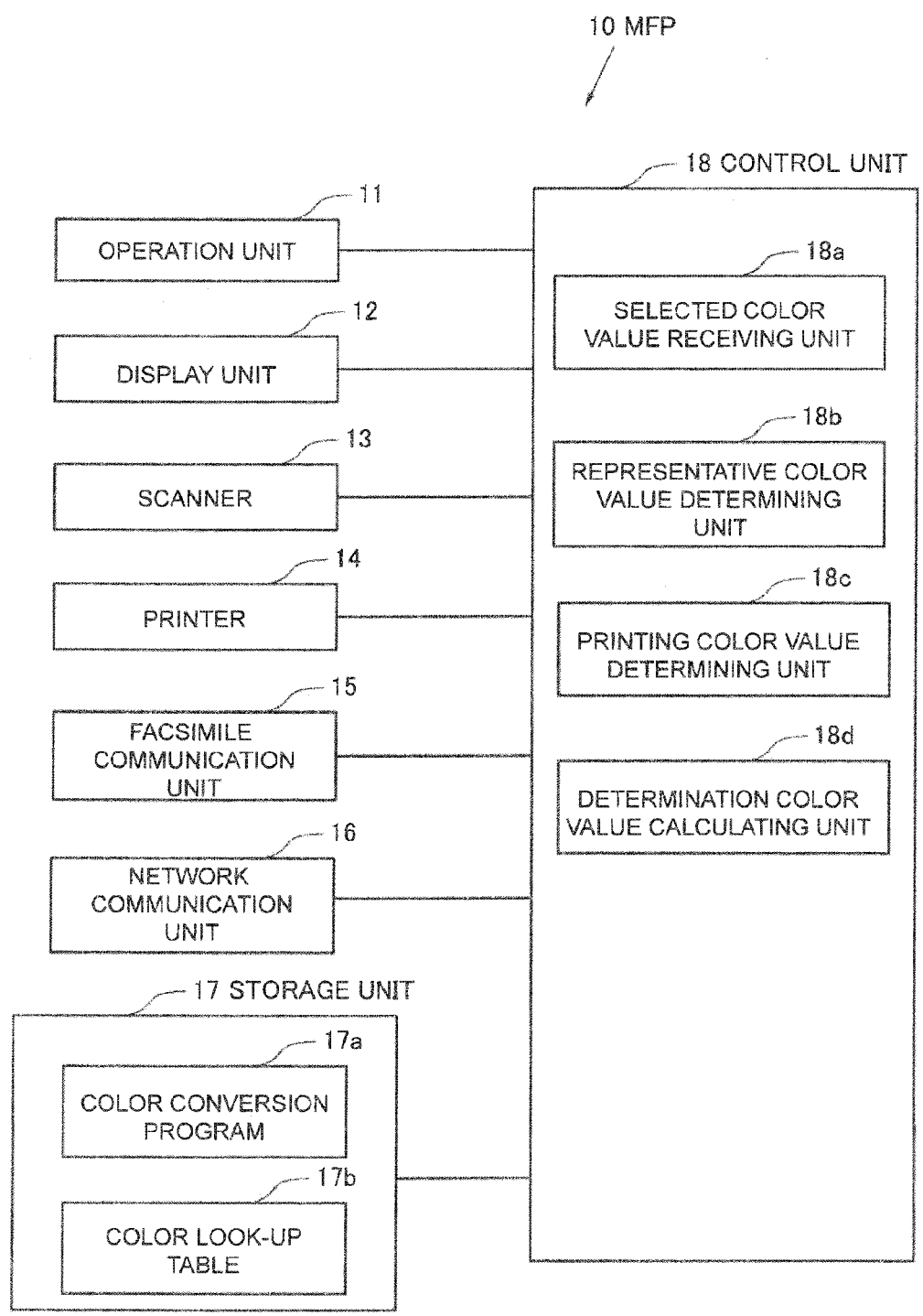
FIG. 1 is a block diagram of an MFP according to an embodiment of the present disclosure.

FIG. 1 is a block diagram of an MFP 10 according to this embodiment.

As illustrated in FIG. 1, the MFP 10 includes: an operation unit 11 as an input device such as a button to which various operations are input; a display unit 12 as a display device such as a liquid crystal display (LCD) for displaying various types of information; a scanner 13 as a device for reading an image from a document; a printer 14 as a printing device for printing an image on a recording medium such as a paper sheet; a facsimile communication unit 15 as a facsimile device for performing facsimile communication with an unillustrated external facsimile machine through a communication line such as a public telephone line; a network communication unit 16 as a communication device for communicating with an external device such as a personal computer (PC) through a network such as a local area network (LAN) or the Internet; a storage unit 17 as a storage device, such as an electrically erasable programmable read only memory (EEPROM) or a hard disk drive (HDD), for storing various types of data; and a control unit 18 for controlling the entire MFP 10.

The printer 14 is a device for performing printing with toners of cyan, yellow, magenta, and black as color materials.

The storage unit 17 stores a color conversion program 17a for converting RGB values as input color values to CMYK values as printing color values for the printer 14. The color conversion program 17a may be installed in the MFP 10 in a fabrication process of the MFP 10, additionally installed in the MFP 10 from a storage medium such as an SD card or a universal serial bus (USB) memory, or additionally installed in the MFP 10 from a network.

The storage unit 17 includes a color look-up table 17b showing a correspondence among RGB values, Lab values as color values of an Lab color space as a device-independent color space, and CMYK values.

The control unit 18 includes, for example, a central processing unit (CPU), a read only memory (ROM) storing a program and various types of data, and a random access memory (RAM) as a main storage device for use as an operation region of a CPU. The CPU executes a program stored in the ROM or the storage unit 17. That is, the MFP 10 constitutes a computer.

The control unit 18 executes the color conversion program 17a stored in the storage unit 17 to function as a selected color value receiving unit 18a that receives a color value selected by a user, a representative color value determining unit 18b that determines a representative color value, a printing color value determining unit 18c that determines a printing color value in a Voronoi diagram whose generatrixes are representative color values in an Lab color space, and a determination color value calculating unit 18d that calculates a determination color value showing a color value for determining a printing color value in the Voronoi diagram.

The Voronoi diagram is a diagram in which the closest space from generatrixes present in a space is divided by a hyperplane such as a line or a surface. That is, the Voronoi diagram can be defined as a collection of Voronoi regions $\{V(p1), V(p2), \ldots, V(pn)\}$ with respect to a finite set $P=\{p1, p2, \ldots, pn\}$ in a metric space. Here, the Voronoi region refers to a region V(pi) constituted by the following Formula 1 with respect to a distance function d. In Formula 1, d(p, pi) is a distance between a point p and a point pi, and d(p, pj) is a distance between the point p and a point pj.

$$V(p_i) = \{p | d(p, p_i) \leq d(p, p_j), i \neq j\}$$ [Formula 1]

Figure 2:
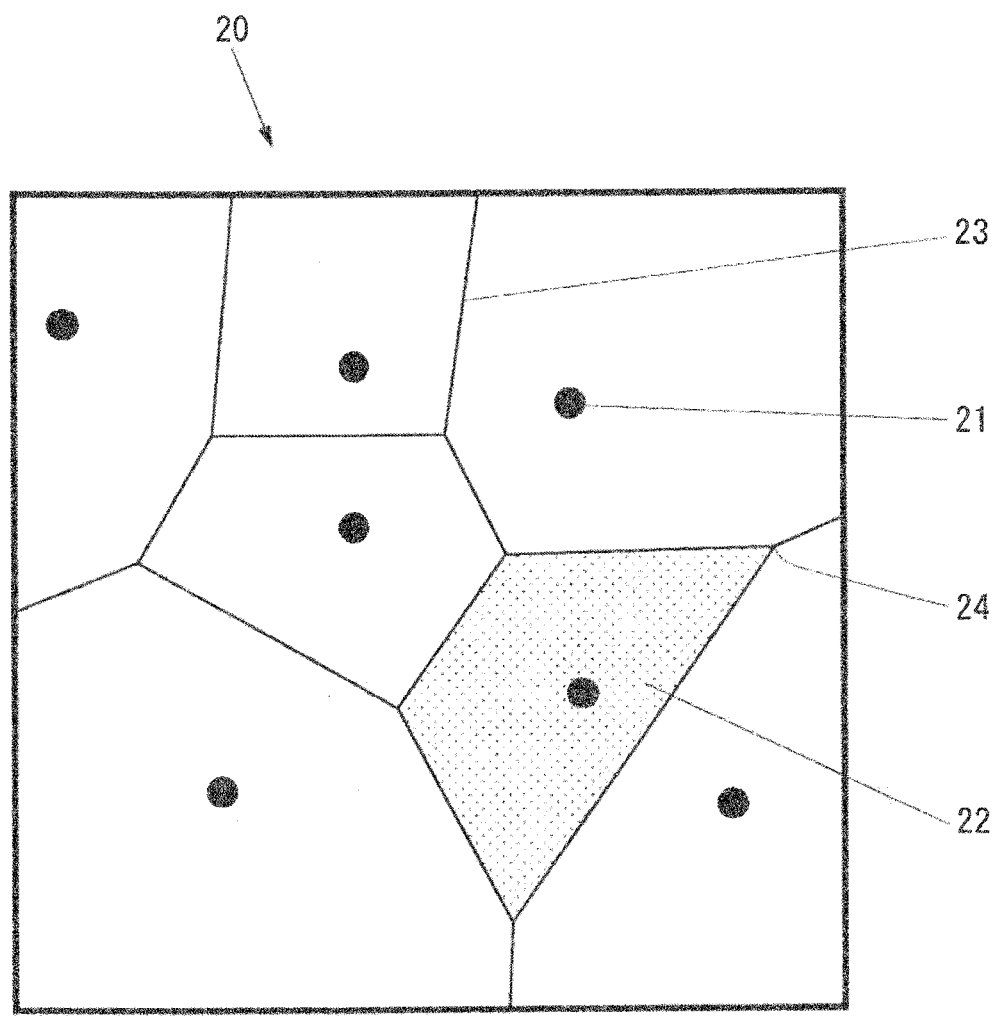
FIG. 2 illustrates an example of a Voronoi diagram created by the MFP illustrated in FIG. 1.

FIG. 2 illustrates an example of a Voronoi diagram 20 created by the MFP 10.

As illustrated in FIG. 2, in the Voronoi diagram 20, representative color values are generatrixes 21. Voronoi regions 22 respectively including the generatrixes 21 are divided by Voronoi edges 23. Intersection points between the Voronoi edges 23 are referred to as Voronoi vertexes 24. The Voronoi diagram 20 illustrated in FIG. 2 is shown in two dimensions for easy understanding, but is actually a three-dimensional Voronoi diagram in an Lab color space.

Operations of the MFP 10 will now be described.

First, an operation of the MFP 10 in the case of determining representative color values is described.

A user can indicate at least one of representative color values to the MFP 10 through the operation unit 11. For example, the user can indicate at least one of the representative color values by specifying a specific color, such as cyan. The user can also indicate a plurality of representative color values if these representative color values are within the same hue. When at least one of the representative color values is indicated, the control unit 18 of the MFP 10 performs a process shown in FIG. 3.

Figure 3:
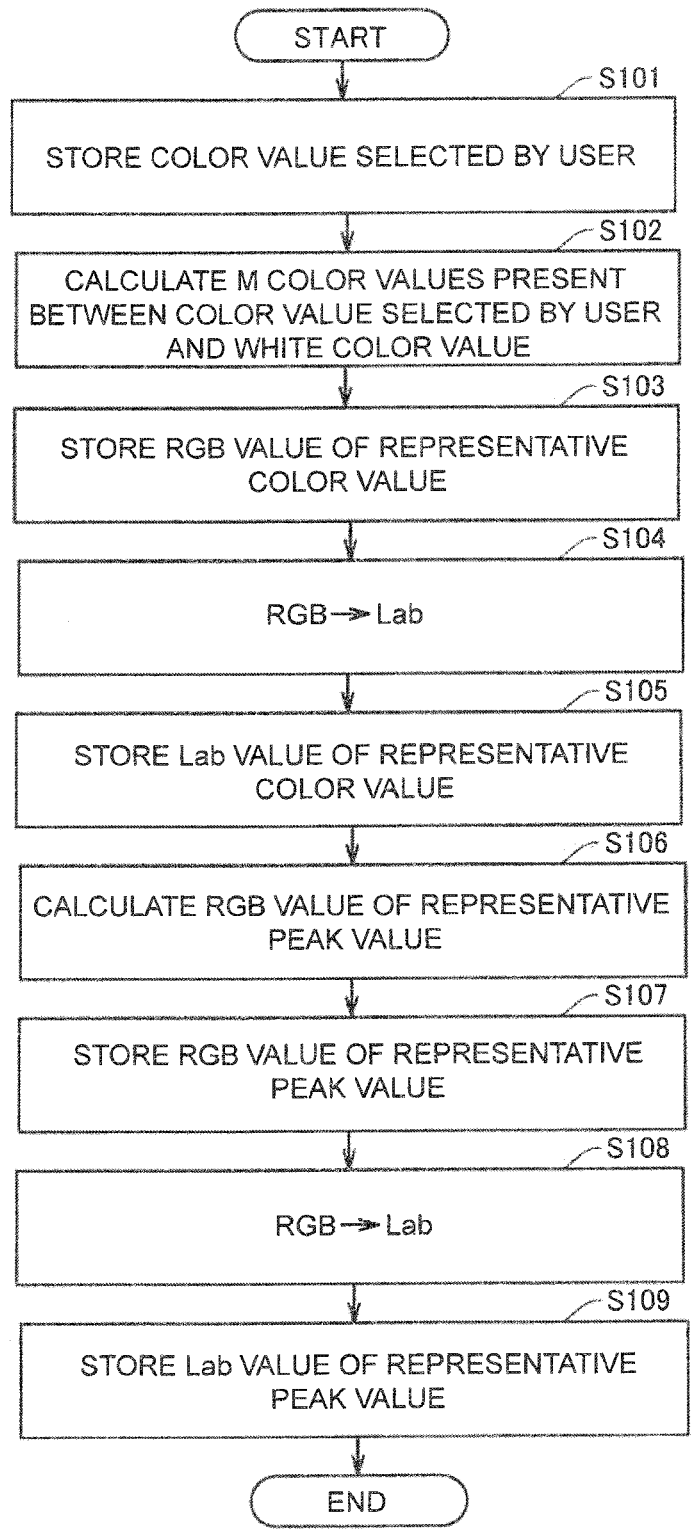
FIG. 3 is a flowchart showing an operation of the MFP illustrated in FIG. 1 in the case of determining representative color values.

FIG. 3 is a flowchart showing an operation of the MFP 10 in the case of determining representative color values.

As illustrated in FIG. 3, the selected color value receiving unit 18a of the control unit 18 receives a color value indicated through the operation unit 11, i.e., a color value selected by the user, and stores the color value in the storage unit 17 (S101).

Next, the representative color value determining unit 18b divides a segment between the color value stored in S101 and a white color value showing a color value of white into portions at regular intervals with m lattice points in an RGB color space (S102). That is, the representative color value determining unit 18b calculates m color values present between the color value stored in S101 and the white color value. Here, m is an integer of one or more, and can be specified by the user.

Then, the representative color value determining unit 18b determines the color value stored in S101, the white color value, and the m color values at the lattice points calculated in S102 as representative color values, and RGB values of the determined representative color values in the storage unit 17 (S103).

Thereafter, the representative color value determining unit 18b converts the representative color values stored in S103 from the RGB values to Lab values by using the color look-up table 17b (S104).

Subsequently, the representative color value determining unit 18b stores the Lab values generated in S104 in the storage unit 17 for each representative color value in association with RGB values (S105).

Then, the representative color value determining unit 18b calculates RGB values of a representative peak value having a maximum color value of saturation in the constant hue plane in an RGB color space of the representative color values stored in S103 (S106).

A method for calculating RGB values of the representative peak value will now be described specifically.

Figure 4A:
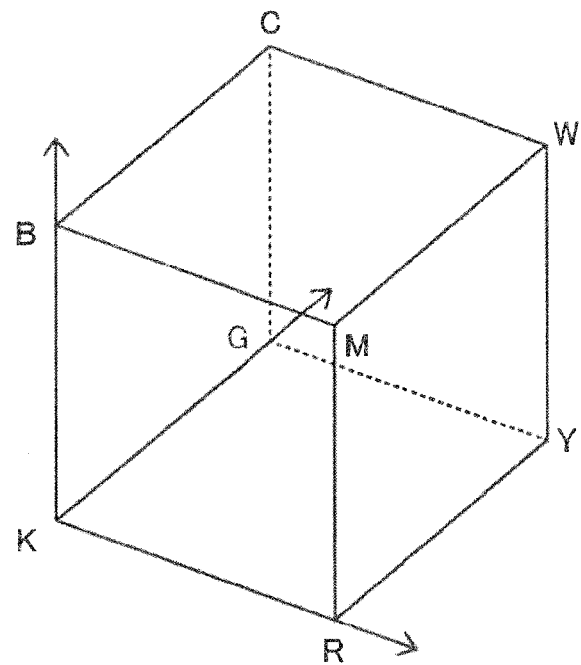
FIG. 4A illustrates an RGB color space in which representative color values in the MFP illustrated in FIG. 1 are arranged.
Figure 4B:
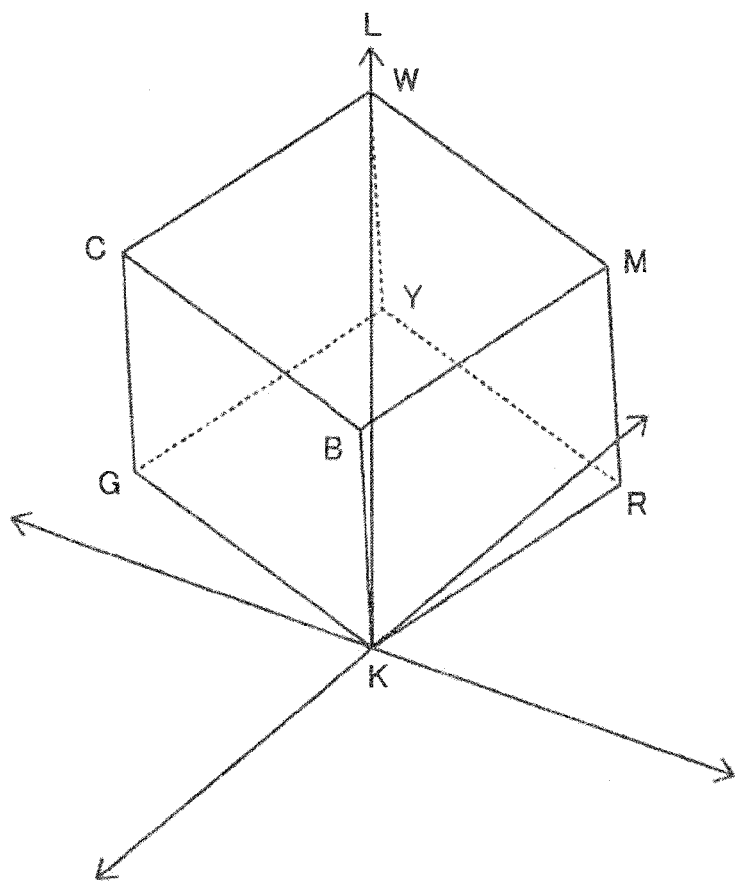
FIG. 4B illustrates the RGB color space of FIG. 4A in which a line connecting black and white is defined as an ordinate.

RGB values of representative color values are arranged in an RGB color space as illustrated in FIG. 4A. In FIGS. 4A and 4B, K, W, R, G, B, C, M, and Y represent black, white, red, green, blue, cyan, magenta, and yellow, respectively.

FIG. 4B illustrates an RGB color space of FIG. 4A in which a line connecting black and white is defined as an ordinate. Specifically, an axis L as an ordinate shown in FIG. 4B represents a lightness whose minimum value is black and maximum value is white. In FIG. 4B, the distance from the axis L represents a saturation that increases as the distance from the axis L increases.

Figure 5:
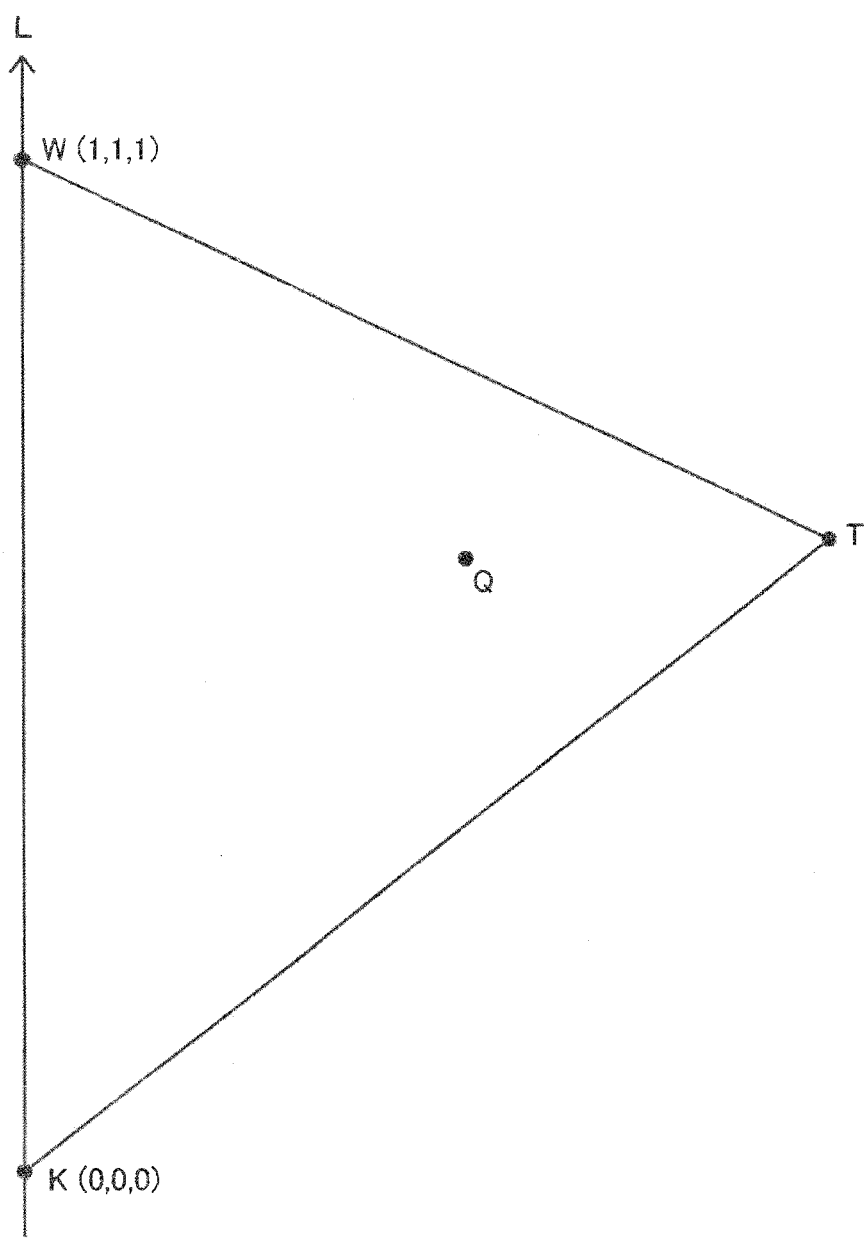
FIG. 5 illustrates a constant hue plane used in the MFP illustrated in FIG. 1.

In the RGB color space illustrated in FIG. 4B, the constant hue plane used in S106 is a plane including a point Q with respect to the axis L shown in FIG. 5, among planes including the axis L and the point Q as a representative color value. The constant hue plane also includes points on the axis L. Since the representative color values stored in S103 have the same hue, and thus, all of these representative color values are included in the constant hue plane.

Since RGB values of a point K, i.e., black, are (0, 0, 0), and RGB values of a point W, i.e., white, are (1, 1, 1), Formulas 2 and 3 are established for the point K and the point W. Similarly, suppose RGB values of the point Q are (Qr, Qg, Qb), Formula 4 is established for the point Q. Suppose RGB values of a point T representing a representative peak value is (Tr, Tg, Tb), Formula 5 is established for the point T.

$$K = \begin{bmatrix} 0 \\ 0 \\ 0 \end{bmatrix}$$ [Formula 2]

$$K = \begin{bmatrix} 0 \\ 0 \\ 0 \end{bmatrix}$$ [Formula 3]

$$Q = \begin{bmatrix} Q_r \\ Q_g \\ Q_b \end{bmatrix}$$ [Formula 4]

$$T = \begin{bmatrix} T_r \\ T_g \\ T_b \end{bmatrix}$$ [Formula 5]

Figure 6:
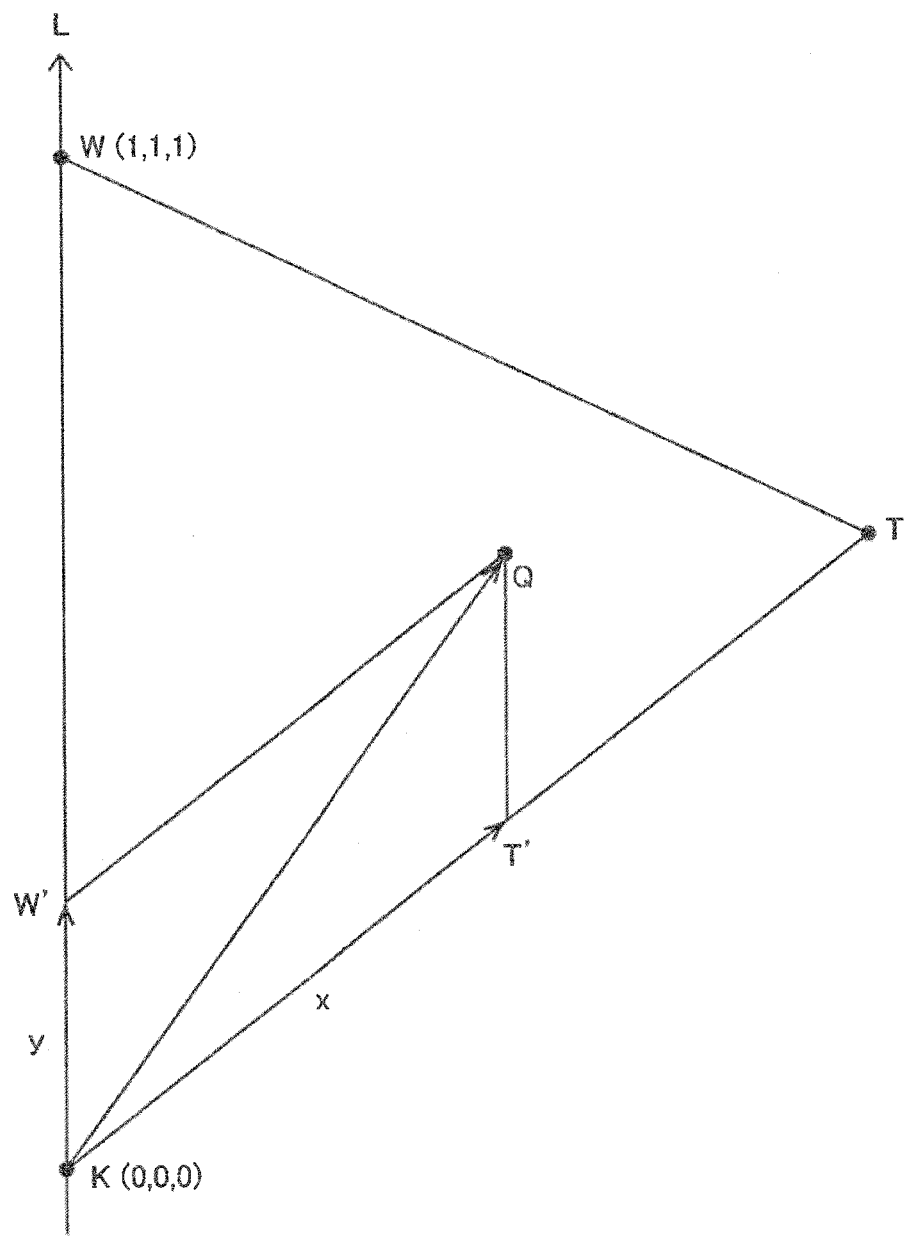
FIG. 6 illustrates a method for calculating representative peak values in the constant hue plane of FIG. 5.

A vector KQ from the point K to the point Q is expressed by Formula 6 using a vector KT from the point K and the point T and a vector KW from the point K to the point W, as illustrated in FIG. 6. In Formula 6, a vector KT' is a vector from the point K to a point T' on a line KT. A vector KW' is a vector from the point K to a point W' on a line KW. In addition, x is a ratio of the length of the vector KT' to the length of the vector KT, and y is a ratio of the length of the vector KW' to the length of the vector KW.

$$\vec{KQ} = \vec{KT'} + \vec{KW'} \quad \text{[Formula 6]}$$
$$= x\vec{KT} + y\vec{KW}$$

Based on Formulas 2 to 6, Formula 7 can be obtained.

$$\begin{bmatrix} Q_r \\ Q_g \\ Q_b \end{bmatrix} = \begin{bmatrix} xT_r + y \\ xT_g + y \\ xT_b + y \end{bmatrix} \quad \text{[Formula 7]}$$

Figure 7:
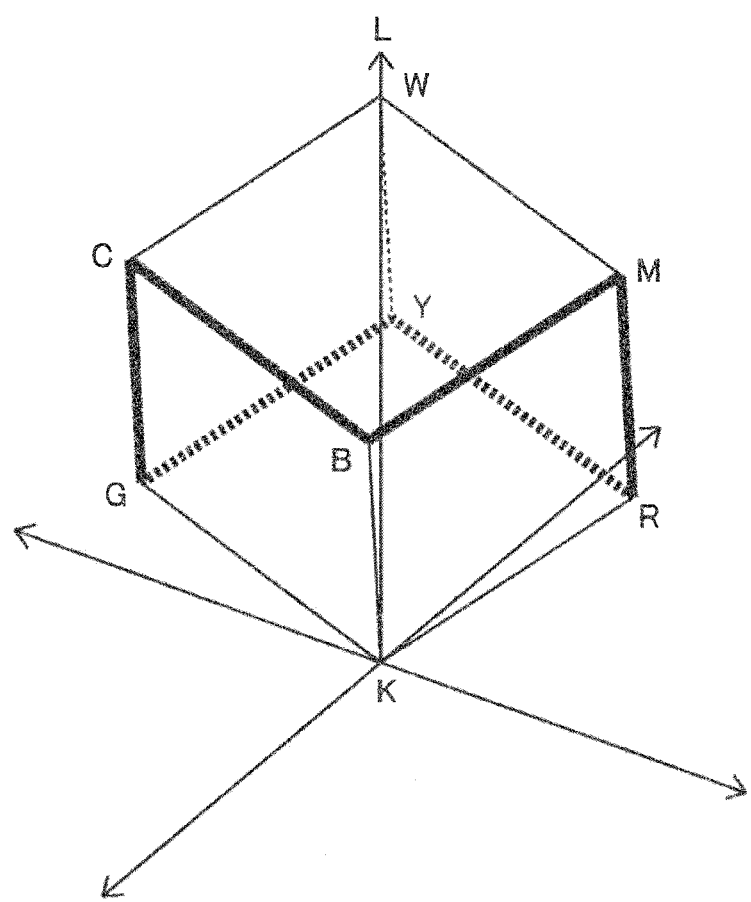
FIG. 7 illustrates positions of representative peak values in the RGB color space shown in FIG. 4B.

In Formula 7, the point T is a point on a line represented by a bold solid line or bold broken line in FIG. 7. That is, at least one of an R value, a G value, and a B value of RGB values of the point T is "0" which is a minimum value, and at least one of the R value, the G value, and the B value of the RGB values of the point T is "1" which is a maximum value. From this relationship and Formula 7, Formulas 8 and 9 are obtained. In Formula 8, min(Q) is the minimum value among a R value, a G value, and a B value of RGB values of the point Q. In Formula 9, max(Q) is the maximum value among the R value, the G value, and the B value of the RGB values of the point Q.

$$\min(Q) = y \quad \text{[Formula 8]}$$

$$\max(Q) = x + y \quad \text{[Formula 9]}$$

From Formulas 6, 8, and 9, Formula 10 is obtained.

$$\vec{KT} = \frac{1}{x}\left(\vec{KQ} - y\vec{KW}\right) \quad \text{[Formula 10]}$$
$$= \frac{1}{\max(Q) - \min(Q)}\left\{\vec{KQ} - \min(Q)\vec{KW}\right\}$$

From Formulas 2 to 5 and Formula 10, Formula 11 is obtained.

$$\begin{bmatrix} T_r \\ T_g \\ T_b \end{bmatrix} = \frac{1}{\max(Q) - \min(Q)} \begin{bmatrix} Q_r - \min(Q) \\ Q_g - \min(Q) \\ Q_b - \min(Q) \end{bmatrix} \quad \text{[Formula 11]}$$

As described above, based on Formula 11, the representative color value determining unit 18b can calculate the RGB values of the point T, i.e., a representative peak value, from the plurality of representative color values stored in S103 except the white color value.

As illustrated in FIG. 3, when the process of S106 is finished, the representative color value determining unit 18b stores, in the storage unit 17, the RGB values of the representative peak value calculated in S106 (S107).

Then, the representative color value determining unit 18b converts the RGB values of the representative peak value stored in S107 to Lab values by using the color look-up table 17b (S108).

Thereafter, the representative color value determining unit 18b stores, in the storage unit 17, the Lab values of the representative peak value generated in S108 (S109), and terminates the operation shown in FIG. 3.

An operation of the MFP 10 in the case of converting color values of pixels of an image to representative color values for printing will now be described.

A user can instruct the MFP 10 through the operation unit 11 to convert color values of pixels of an image to representative color values for printing. Here, the user can specify any image. The image specified by a user will be hereinafter referred to as a target image. When it is instructed to convert color values of pixels of the target image to representative color values for printing, the control unit 18 of the MFP 10 starts a process shown in FIG. 8.

Figure 8:
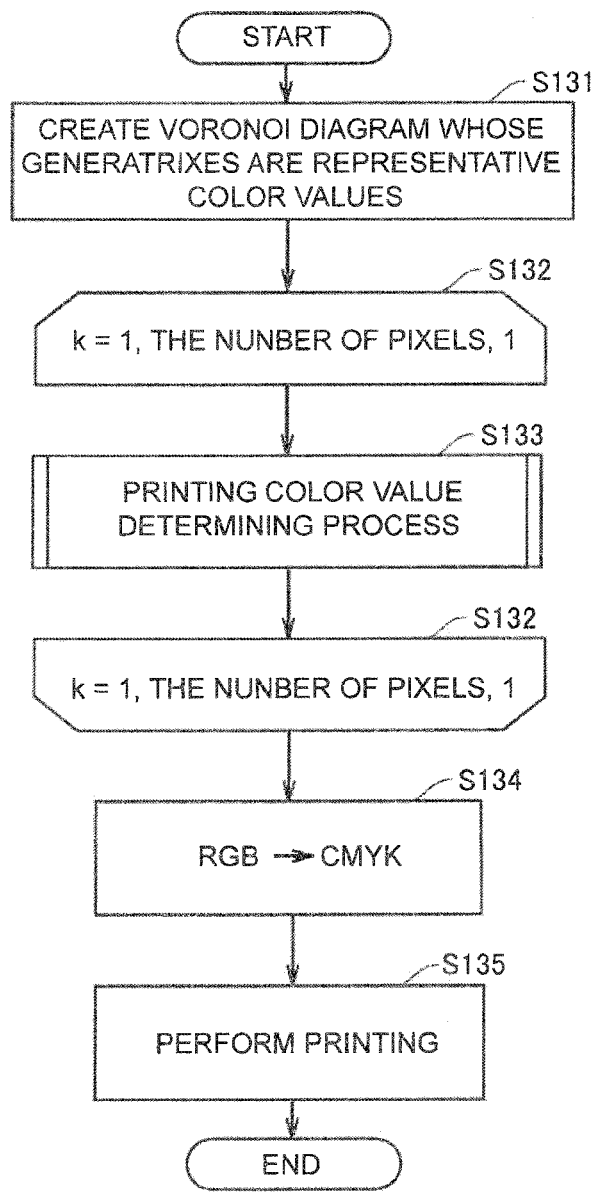
FIG. 8 is a flowchart showing an operation of the MFP illustrated in FIG. 1 in the case of converting color values of pixels in an image to representative color values for printing.

FIG. 8 is a flowchart showing an operation of the MFP 10 in the case of converting color values of pixels of a target image to representative color values for printing.

As shown in FIG. 8, the printing color value determining unit 18c of the control unit 18 generates a Voronoi diagram 20 whose generatrixes 21 are Lab values of representative color values stored in the storage unit 17 in S105, in an Lab color space (S131).

Figure 9:
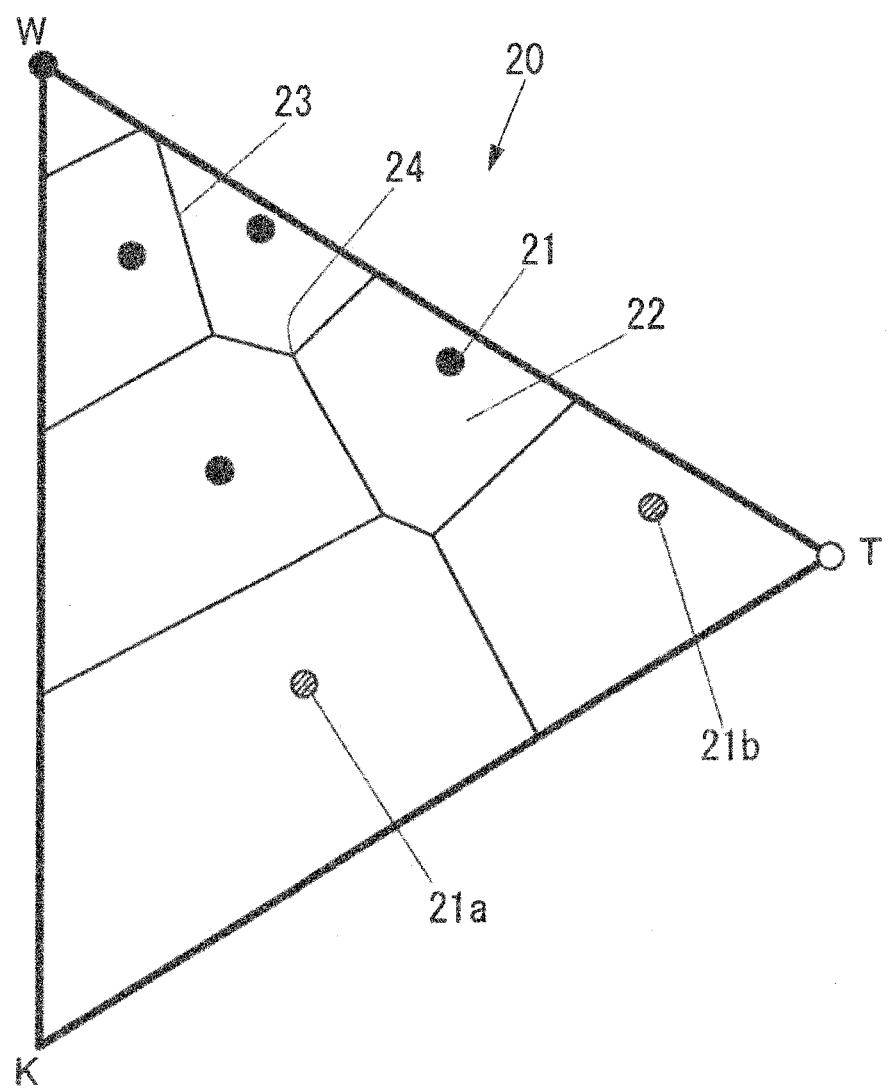
FIG. 9 illustrates an example of a Voronoi diagram created in the process shown in FIG. 8.

FIG. 9 illustrates an example of the Voronoi diagram 20 created in S131.

The Voronoi diagram 20 illustrated in FIG. 9 is a Voronoi diagram in a constant hue plane of representative color values. In the Voronoi diagram 20 illustrated in FIG. 9, a generatrix 21a and a generatrix 21b are representative color values corresponding to color values stored in the storage unit 17 in S101. Generatrixes 21 on a line connecting the white point W and the generatrix 21a are representative color values corresponding to color values calculated in S102 based on the white color value and the color value represented by the generatrix 21a. Similarly, generatrixes 21 on a line connecting the point W and the generatrix 21b are representative color values corresponding to color values calculated in S102 based on the white color value and the color value represented by the generatrix 21b. In the Voronoi diagram 20 illustrated in FIG. 9, the point T is a point representing a representative peak value.

As shown in FIG. 8, when the process of S131 is finished, the control unit 18 repeatedly performs a process of performing a printing color value determining process in S133 for determining a printing color value corresponding to an input color value as a color value of a pixel of the target image to increase a variable k by 1 (one) until the variable k exceeds the number of pixels in the target image with an initial value of the variable k being set as 1 (one) (S132). That is, the control unit 18 performs the printing color value determining process in S133 for all the pixels in the target image.

Figure 10:
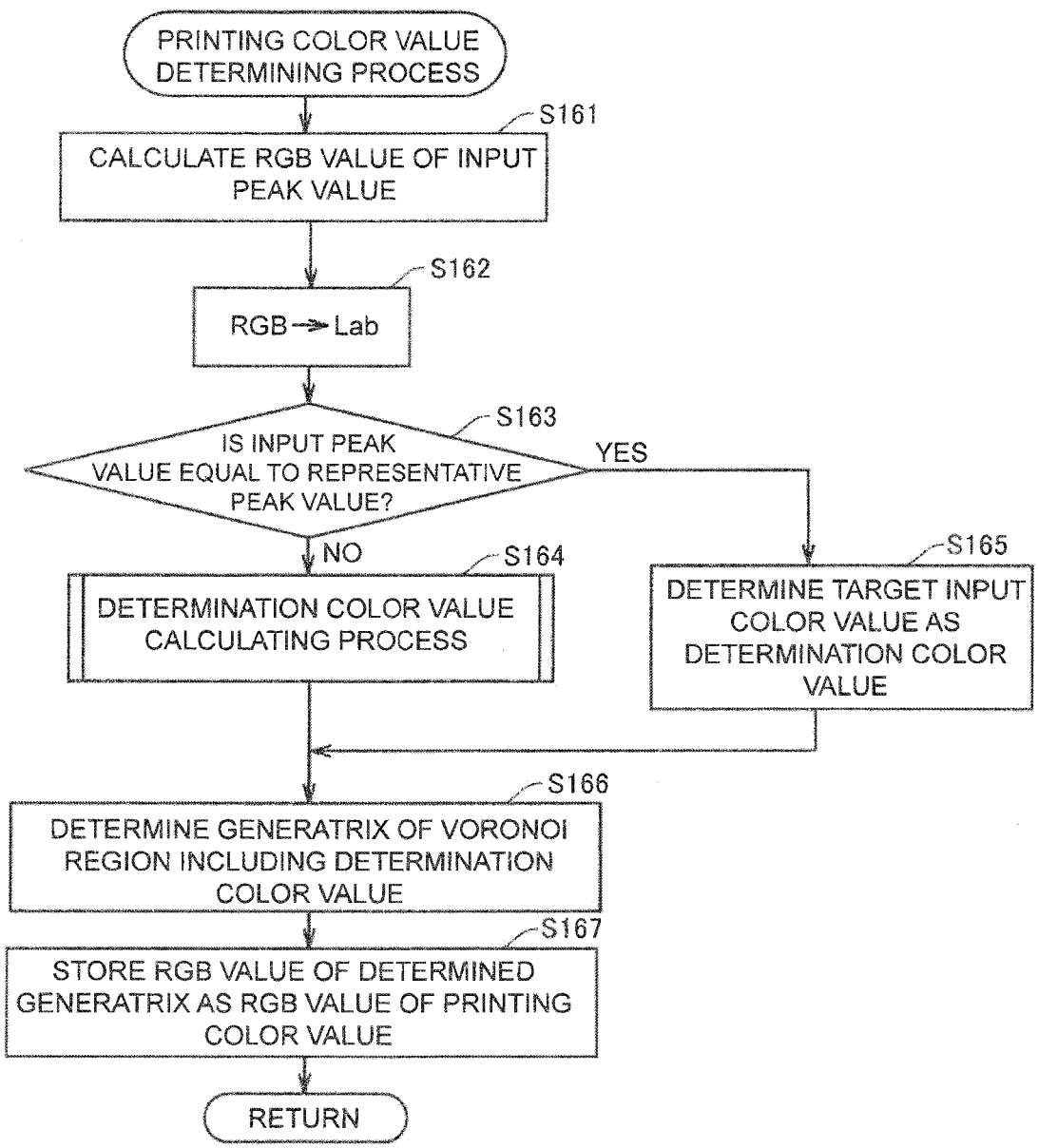
FIG. 10 is a flowchart of a printing color value determining process shown in FIG. 8.

FIG. 10 is a flowchart of the printing color value determining process shown in FIG. 8.

As shown in FIG. 10, the determination color value calculating unit 18d of the control unit 18 calculates RGB values of an input peak value showing a maximum color value of saturation in a constant hue plane in an RGB color space of an input color value that is currently a target (hereinafter referred to as a "target input color value") in a manner similar to S106 (S161).

Then, the determination color value calculating unit 18d converts the RGB values of the input peak value calculated in S161 to Lab values by using the color look-up table 17b (S162).

Thereafter, the determination color value calculating unit 18d determines whether the RGB values of the input peak value calculated in S161 are the same as the RGB values of the representative peak value stored in the storage unit 17 in S107 (S163).

Figure 11:
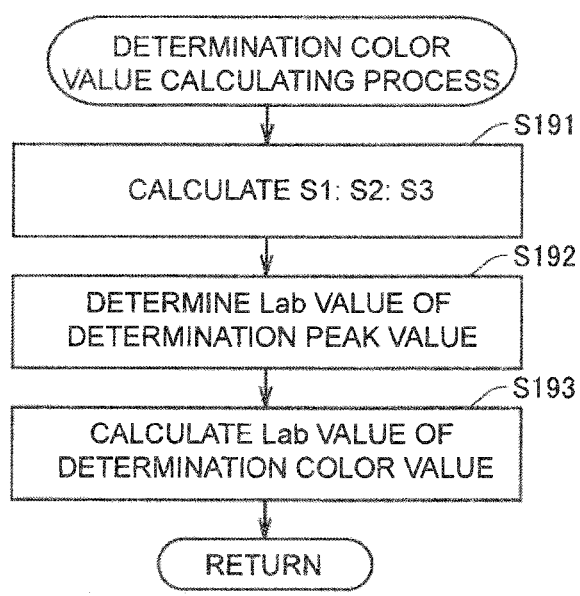
FIG. 11 is a flowchart of a determination color value calculating process shown in FIG. 10.

If the determination color value calculating unit 18d determines that the RGB values of the input peak value are not the same as the RGB values of the representative peak value in S163, the determination color value calculating unit 18d performs a determination color value calculating process of calculating a determination color value shown in FIG. 11 (S164).

FIG. 11 is a flowchart of the determination color value calculating process shown in FIG. 10.

As illustrated in FIG. 11, the determination color value calculating unit 18d calculates a ratio among an area S1 of a triangle formed by a white color value, a black color value showing a color value of black, and a target input color value in an Lab color space, an area S2 of a triangle formed by the white color value, an input peak value, and the target input color value in the Lab color space, and an area S3 of a triangle formed by the black color value, the input peak value, and the target input color value in the Lab color space (S191).

Figure 12:
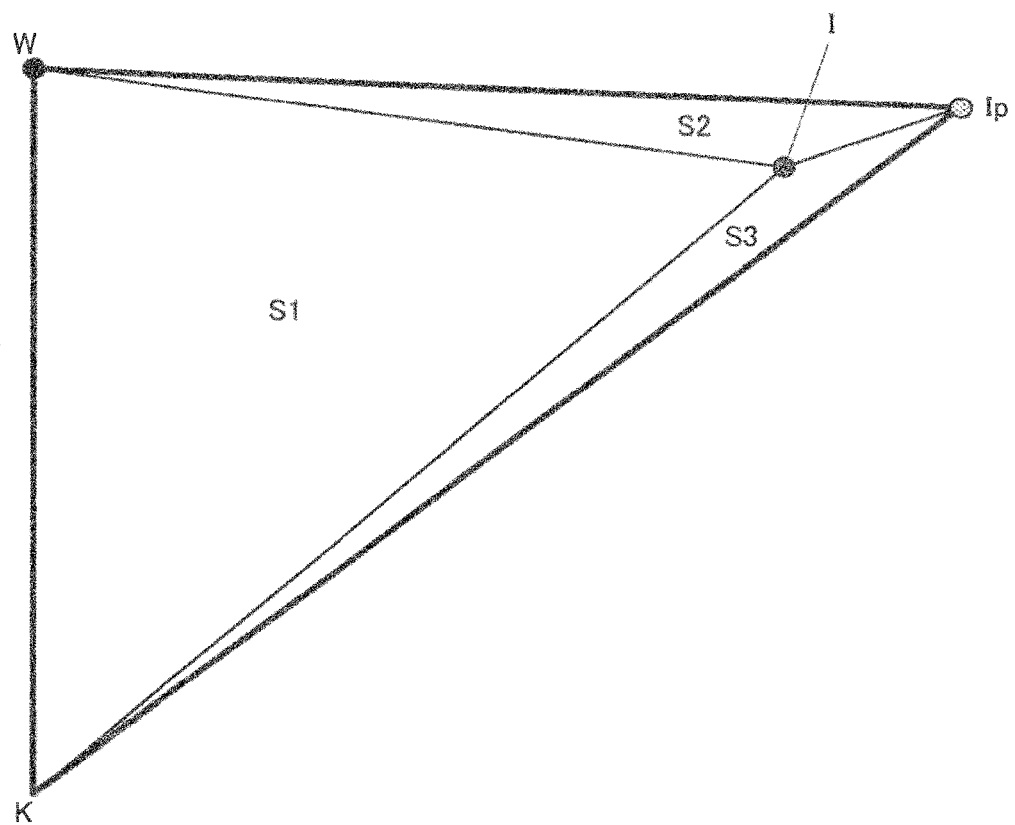
FIG. 12 illustrates an example of a constant hue plane in an Lab color space of target input color values in the determination color value calculating process shown in FIG. 11.

FIG. 12 illustrates an example of a constant hue plane in an Lab color space of a target input color value.

In FIG. 12, the point W, the point K, the point I, and the point Ip represent a white color value, a black color value, a target input color value, and an input peak value, respectively. The area S1 can be calculated from Lab values of the white color value, Lab values of the black color value, and Lab values of the target input color value. Similarly, the area S2 can be calculated from the Lab values of the white color value, Lab values of the input peak value, and the Lab values of the target input color value. The area S3 can be calculated from the Lab values of the black color value, the Lab values of the input peak value, and the Lab values of the target input color value.

As illustrated in FIG. 11, after the process in S191, the determination color value calculating unit 18d determines Lab values of a determination peak value for calculating a determination color value (S192). That is, the determination color value calculating unit 18d determines, as a determination peak value, a color value having a lightness equal to that of the input peak value and a hue and a saturation equal to those of the representative peak value.

Then, the determination color value calculating unit 18d calculates a determination color value as shown in Formula 12 in such a way that a positional relationship of the target input color value relative to the input peak value, the white color value, and the black color value is equal to a positional relationship of the determination color value relative to the determination peak value, the white color value, and the black color value (S193). In Formula 12, I' (Lab), Ip' (Lab), K (Lab), and W (Lab) represent Lab values of the determination color value, the determination peak value, the white color value, and the black color value, respectively.

[Formula 12]
$$I'(Lab) = \frac{S1 \times I'_p(Lab) + S2 \times K(Lab) + S3 \times W(Lab)}{S1 + S2 + S3}$$

Figure 13:
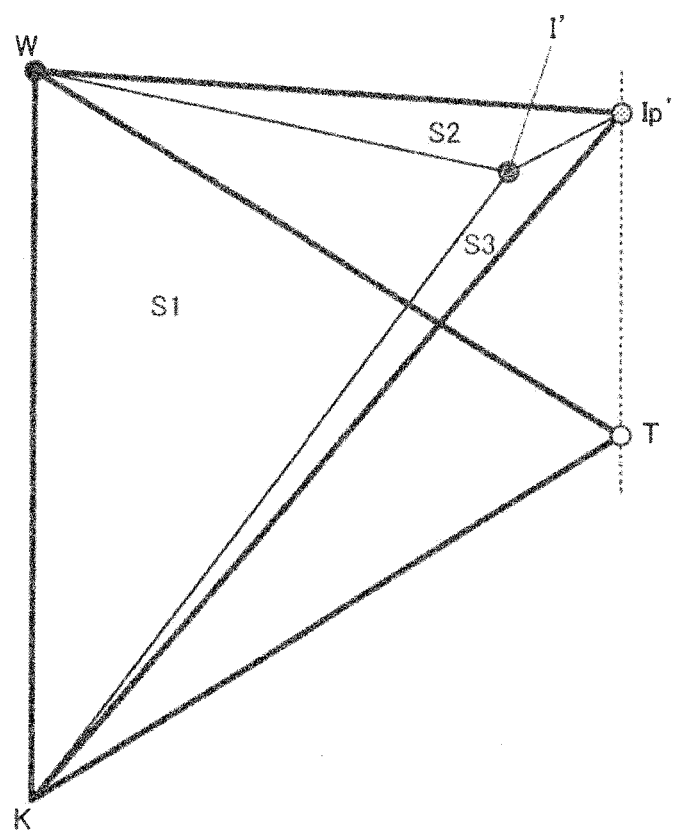
FIG. 13 illustrates an example of a constant hue plane in an Lab color space of a determination color value in the determination color value calculating process shown in FIG. 11.

Specifically, as illustrated in FIG. 13, the determination color value calculating unit 18d calculates Lab values of the determination color value to obtain a relationship of S1:S2:S3 as an area ratio calculated in S191 with respect to the area of the triangle formed by the white color value, the black color value, the determination color value in the Lab color space, the area of the triangle formed by the white color value, the determination peak value, and the determination color value in the Lab color space, and the area of the triangle formed by the black color value, the determination peak value, and the determination color value in the Lab color space.

In FIG. 13, the point W, the point K, the point T, the point I', and the point Ip' represent the white color value, the black color value, the representative peak value, the determination color value, and the determination peak value, respectively.

As shown in FIG. 11, when the process in S193 is finished, the determination color value calculating unit 18d terminates the determination color value calculating process shown in FIG. 11.

As illustrated in FIG. 10, if the determination color value calculating unit 18d determines that the RGB values of the input peak value are the same as the RGB values of the representative peak value in S163, the determination color value calculating unit 18d determines the target input color value as a determination color value since the target input color value is included in the constant hue plane of the representative color value (S165).

Figure 14:
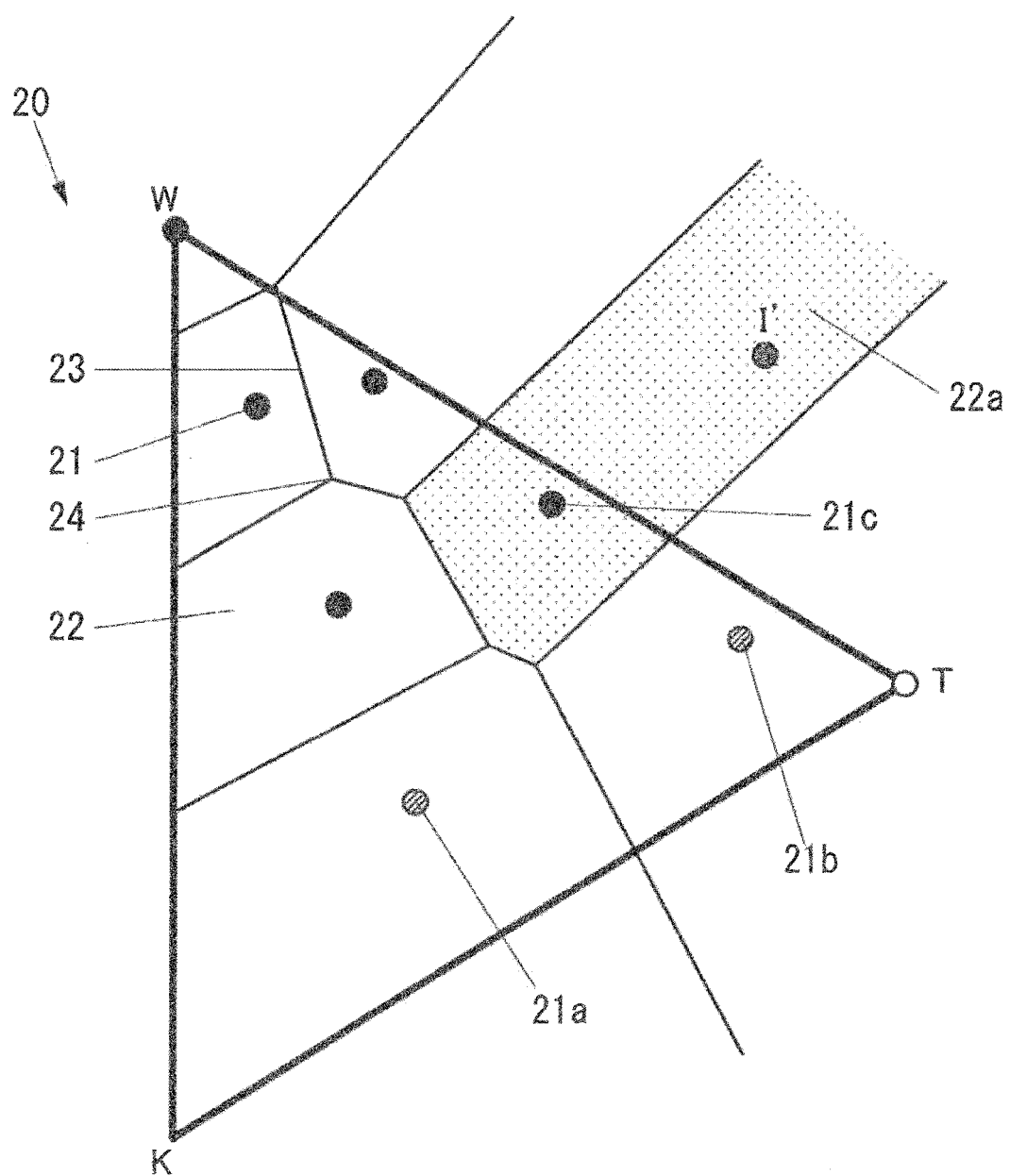
FIG. 14 illustrates an example of the constant hue plane in an Lab color space of representative color values in the printing color value determining process shown in FIG. 10.

Thereafter, in the Voronoi diagram 20 created in S131, the printing color value determining unit 18c determines, by nearest neighbor search, a generatrix 21 of the Voronoi region 22 including either the determination color value calculated in S164 or the determination color value determined in S165 (S166). For example, in the example illustrated in FIG. 14, the printing color value determining unit 18c determines a generatrix 21c of the Voronoi region 22a as the generatrix 21 of the Voronoi region 22 including the point I' representing the determination color value.

A method for searching for the generatrix 21 by nearest neighbor search will now be described.

FIGS. 15A to 15C and FIGS. 16A and 16B illustrate a method for searching for generatrixes 21 by nearest neighbor search.

In examples illustrated in FIGS. 15A to 15C and FIGS. 16A and 16B, a generatrix 21 of a Voronoi region 22 including the point I' is searched for by nearest neighbor search.

Figure 15A:
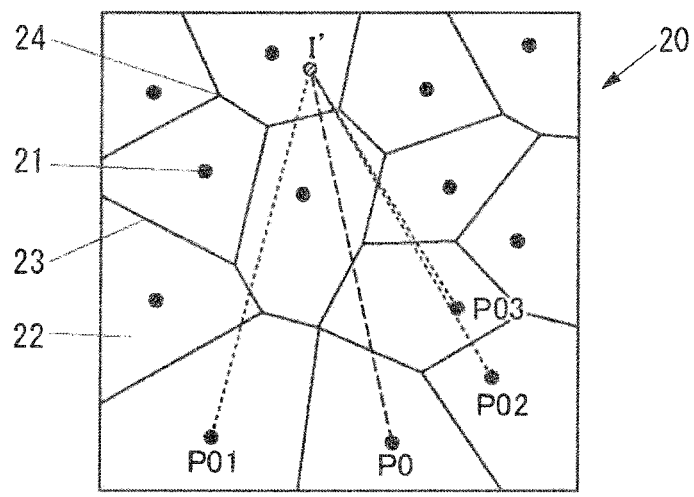
FIG. 15A illustrates a method for searching for generatrixes by nearest neighbor search in the printing color value determining process shown in FIG. 10.

First, as illustrated in FIG. 15A, in the Voronoi diagram 20, the printing color value determining unit 18c selects a generatrix P0 and specifies generatrixes P01, P02, and P03 near the generatrix P0. Based on the distance from the point I', the printing color value determining unit 18c obtains a generatrix closest to the point I' among the generatrixes P0, P01, P02, and P03. In the example illustrated in FIG. 15A, among the generatrixes P0, P01, P02, and P03, the generatrix P03 is a generatrix closest to the point I'.

Figure 15B:
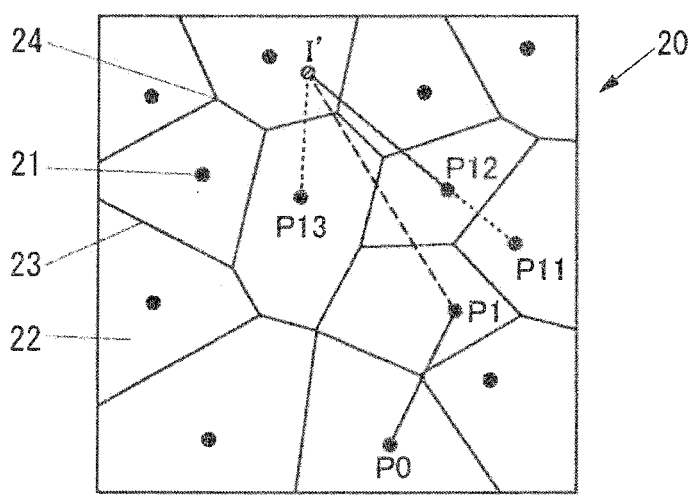
FIG. 15B illustrates a state subsequent to the state shown in FIG. 15A.

Next, as illustrated in FIG. 15B, the printing color value determining unit 18c specifies generatrixes P11, P12, and P13 that have not been determined yet as targets among the generatrixes near a generatrix P1 that is the generatrix P03 obtained in the example illustrated in FIG. 15A. Based on the distance from the point I', the printing color value determining unit 18c obtains a generatrix closest to the point I' among the generatrixes P1, P11, P12, and P13. In the example illustrated in FIG. 15B, the generatrix P13 is the generatrix closest to the point I' among the generatrixes P1, P11, P12, and P13.

Figure 15C:
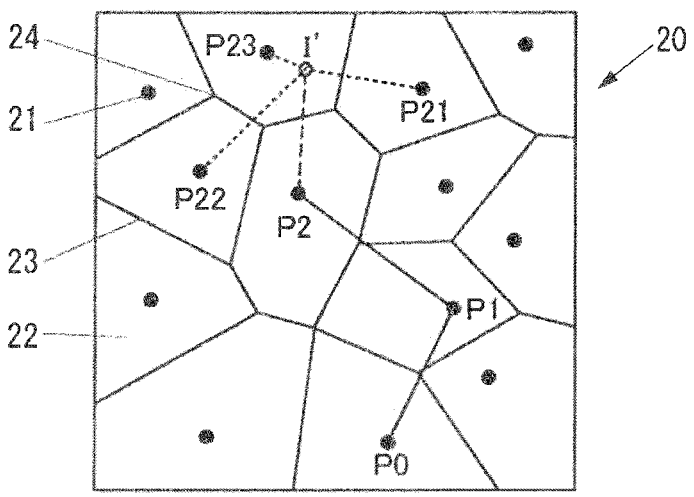
FIG. 15C illustrates a state subsequent to the state shown in FIG. 15B.

Then, as illustrated in FIG. 15C, the printing color value determining unit 18c specifies generatrixes P21, P22, and P23 that have not been determined yet as targets among the generatrixes near a generatrix P2 that is the generatrix P13 obtained in the example illustrated in FIG. 15B. Thereafter, based on the distance from the point I', the printing color value determining unit 18c obtains a generatrix closest to the point I' among the generatrixes P2, P21, P22, and P23. In the example illustrated in FIG. 15C, the generatrix P23 is the generatrix closest to the point I' among the generatrixes P2, P21, P22, and P23.

Figure 16A:
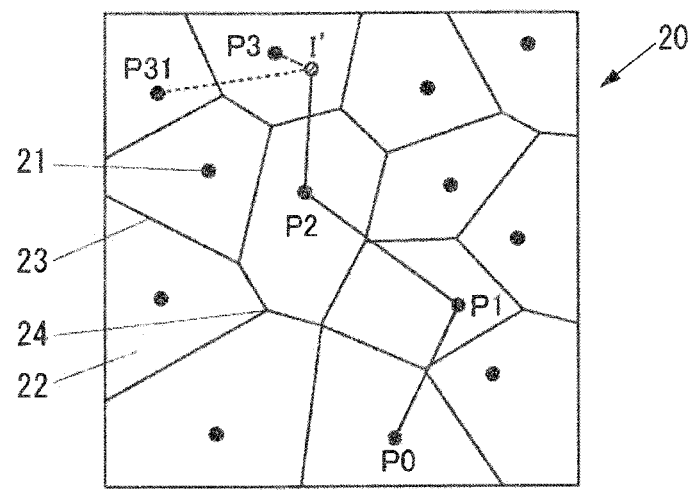
FIG. 16A illustrates a state subsequent to the state shown in FIG. 15C.

Subsequently, as illustrated in FIG. 16A, the printing color value determining unit 18c specifies a generatrix P31 that has not been determined yet as a target among the generatrixes near the generatrix P3 that is the generatrix P23 obtained in the example illustrated in FIG. 15C. Based on the distance from the point I', the printing color value determining unit 18c obtains a generatrix closest to the point I' between the generatrixes P3 and P31. In the example illustrated in FIG. 16A, the generatrix P3 is a generatrix closest to the point I' between the generatrixes P3 and P31.

Figure 16B:
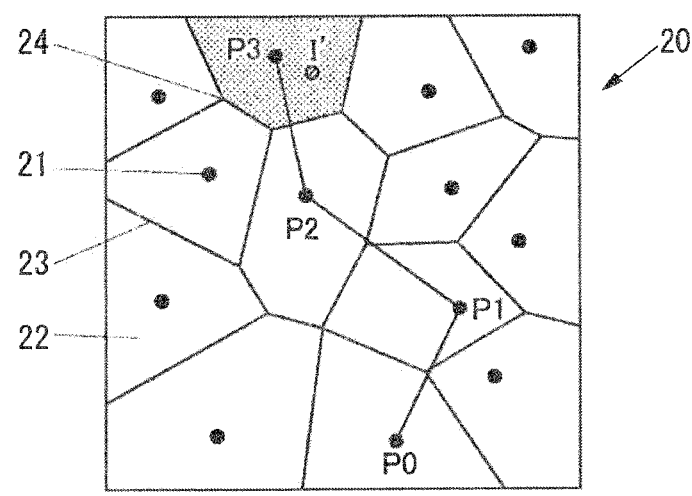
FIG. 16B illustrates a state subsequent to the state shown in FIG. 16A.

Lastly, since no generatrixes are located closer to the point I' than the generatrix P3 is among the generatrixes near the generatrix P3, the printing color value determining unit 18c determines the generatrix P3 as a generatrix 21 of the Voronoi region 22 including the point I', as illustrated in FIG. 16B.

As illustrated in FIG. 10, the printing color value determining unit 18c determines the RGB values of the generatrix 21 determined in S166 as RGB values of the printing color value, and stores the determined RGB values of the printing color value in the storage unit 17 or a RAM of the control unit 18 (S167). That is, the printing color value determining unit 18c determines, as a printing color value, either the determination color value calculated in S164 or the representative color value closest to the determination color value determined in S165, in the Voronoi diagram 20 created in S131.

After the process in S167, the printing color value determining unit 18c terminates the printing color value determining process shown in FIG. 10.

As illustrated in FIG. 8, when the variable k exceeds the number of pixels in the target image in the process in S132, the control unit 18 converts the RGB values of the printing color value determined in S133 as CMYK values by using the color look-up table 17b (S134).

Then, the control unit 18 causes the printer 14 to perform printing based on the CMYK values obtained by conversion in S134 (S135). That is, the control unit 18 causes the printer 14 to print an image all of whose pixels have been converted to CMYK values of the printing color value.

After the process in S135, the control unit 18 terminates the process shown in FIG. 8.

As described above, the MFP 10 causes the lightness, hue, and saturation of a determination peak value for calculating a determination color value showing a color value for determining a printing color value in the Voronoi diagram 20 whose generatrixes 21 are representative color values in an Lab color space to be equal to the lightness of an input peak value showing a maximum color value of saturation in a constant hue plane of an input color value and the hue and saturation of a representative peak value showing a maximum color value of saturation in a constant hue plane of a representative color value (S192), and calculates a determination color value in such a way that a positional relationship of an input color value relative to an input peak value, a white color value, and a black color value is equal to a positional relationship of a determination color value relative to a determination peak value, a white color value, and a black color value (S193). Thus, the difference in lightness and saturation between the input color value and the printing color value converted from the input color value can be reduced as compared to typical techniques. Thus, in the case of converting an input color value to one of a plurality of representative color values and using the converted color value as a printing color value for a printing device, the MFP 10 can obtain a print result with a natural color tone as compared to typical techniques.

Here, in the case of performing printing with printing color values composed of representative color values, the hue of the printing color values is limited by the representative color values. Thus, as compared to a case where the input color values are not converted to representative color values and used as printing color values for printing, the difference in lightness, which affects the concentration of a print result, significantly affects color tone of a print result. In the case of obtaining a determination color value by correcting an input color value (S164), the MFP 10 maintains lightness between the input peak value and the determination peak value. Thus, even in the case of performing printing with printing color values composed of representative color values, a print result with a natural color tone can be obtained.

In addition, the MFP 10 automatically generates a plurality of representative color values based on a color value selected by a user (S101 to S103). Thus, representative color values can be received by simple indication by the user.

The MFP 10 may receive representative color values from the user with other methods. For the MFP 10, representative color values may be fixed.

In this embodiment, the MFP 10 performs the operation of determining representative color values and the operation of converting color values of pixels in a target image to representative color values and performing printing, as separate operations. However, the MFP 10 may perform these operations as a series of operations. In the case of performing the operation of determining representative color values and the operation of converting color values of pixels in a target image to representative color values and performing printing as a series of operations, the MFP 10 may store various types of information generated in the series of operations in a RAM of the control unit 18, not in the storage unit 17.

In this embodiment, the MFP 10 stores only representative color values in the same constant hue plane in S103. Alternatively, the MFP 10 may store representative color values in different constant hue planes in S103. In this case, the MFP 10 uses a representative color value in a constant hue plane whose hue angle is closest to that of an input color value for each of input color values among representative color values in the different constant hue planes, in the process shown in FIG. 8. In a case where two constant hue planes have closest hue angles to that of the input color value among a plurality of constant hue planes including representative color values stored in S103, the MFP 10 uses representative color values in a constant hue plane selected according to a specific rule in the process shown in FIG. 8. For example, the MFP 10 uses representative color values in a constant hue plane having a representative peak value closest to that of the input peak value between two constant hue planes including the representative color values stored in S103 having a hue angle closest to that of the input color value, in the process shown in FIG. 8.

A color converter according to the present disclosure is the MFP in this embodiment, but may be an image forming apparatus, such as a machine dedicated to a printer or a machine dedicated to a copier, except an MFP, or may be an electronic equipment, such as a personal computer (PC), except an image forming apparatus.

What is claimed is:

1. An image forming apparatus comprising:
a storage unit including at least one of an electrically erasable programmable read only memory, EEPROM, and a hard disk drive, HDD, for storing various types of data;
a control unit including a central processing unit, CPU, for controlling the image forming apparatus; and
a printer including a device for performing printing with toners of cyan, yellow, magenta, and black as color materials,
wherein:
the storage unit including at least one of the EEPROM and the HDD stores a color conversion program for converting an input color value to a representative color value within a constant hue plane and using the converted color value as a printing color value for the printer; and
the control unit including the CPU executes the color conversion program stored in the storage unit to function as a printing color value determining unit, and a determination color value calculating unit,
wherein
the control unit including the CPU as the printing color value determining unit determines the printing color value in a Voronoi diagram whose generatrixes are the representative color value in a device-independent color space; and
the control unit including the CPU as the determination color value calculating unit calculates a determination color value showing a color value for determining the printing color value, and
wherein
the control unit including the CPU as the determination color value calculating unit determines, as a determination peak value, a color value having a lightness equal to that of an input peak value showing a maximum color value of saturation in a constant hue plane of the input color value and also having a hue and a saturation equal to those of a representative peak value showing a maximum color value of saturation in a constant hue plane of the representative color value;
the control unit including the CPU as the determination color value calculating unit calculates the determination color value in such a way that a positional relationship of the input color value relative to the input peak value, a white color value showing a color value of white, and a black color value showing a color value of black is equal to a positional relationship of the determination color value relative to the determination peak value, the white color value, and the black color value; and
the control unit including the CPU as the printing color value determining unit determines, as the printing color value, the representative color value closest to the determination color value calculated by the control unit including the CPU as the determination color value calculating unit in the Voronoi diagram; wherein the printer forms an image based on the representative color value closest to the determination color value.

2. The image forming apparatus according to claim 1, wherein the control unit including the CPU executes the color conversion program stored in the storage unit to function as a selected color value receiving unit, and a representative color value determining unit, and wherein:
the control unit including the CPU as the selected color value receiving unit receives a color value selected by a user; and
the control unit including the CPU as the representative color value determining unit determines the representative color value, and
wherein
the control unit including the CPU as the representative color value determining unit calculates one or more color values present between the color value received by the control unit including the CPU as the selected color value receiving unit and the white color value, and determines, as the representative color values, the calculated color value, the color value received by the control unit including the CPU as the selected color value receiving unit, and the white color value.

3. An image forming method by an image forming apparatus, the image forming apparatus including:
a storage unit including at least one of an electrically erasable programmable read only memory, EEPROM, and a hard disk drive, HDD, for storing various types of data;
a control unit including a central processing unit, CPU, for controlling the image forming apparatus; and
a printer including a device for performing printing with toners of cyan, yellow, magenta, and black as color materials,
wherein
the storage unit including at least one of the EEPROM and the HDD stores a color conversion program for converting an input color value to a representative color value within a constant hue plane and using the converted color value as a printing color value for the printer, and
the control unit including the CPU executes the color conversion program stored in the storage unit to function as a printing color value determining unit, and a determination color value calculating unit,
the method comprising:
via the control unit including the CPU as the printing color value determining unit, determining the printing color value in a Voronoi diagram whose generatrixes are the representative color value in a device-independent color space;
via the control unit including the CPU as the determination color value calculating unit, calculating a determination color value showing a color value for determining the printing color value;
via the control unit including the CPU as the determination color value calculating unit, determining, as a determination peak value, a color value having a lightness equal to that of an input peak value showing a maximum color value of saturation in a constant hue plane of the input color value and also having a hue and a saturation equal to those of a representative peak value showing a maximum color value of saturation in a constant hue plane of the representative color value;
via the control unit including the CPU as the determination color value calculating unit, calculating the determination color value in such a way that a positional relationship of the input color value relative to the input peak value, a white color value showing a color value of white, and a black color value showing a color value of black is equal to a positional relationship of the determination color value relative to the determination peak value, the white color value, and the black color value; and via the control unit including the CPU as the printing color value determining unit, determining, as the printing color value, the representative color value closest to the determination color value calculated in the control unit including the CPU as the determination color value calculating unit in the Voronoi diagram; forming an image by the printer based on the representative color value closest to the determination color value.

* * * * *